United States Patent
Shubitidze et al.

(10) Patent No.: US 11,153,941 B2
(45) Date of Patent: Oct. 19, 2021

(54) MULTI-COIL INDUCTION HOB AND METHOD

(71) Applicant: THE TRUSTEES OF DARTMOUTH COLLEGE, Hanover, NH (US)

(72) Inventors: Fridon Shubitidze, Hanover, NH (US); Robert Vincent Stigliano, Austin, TX (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 0 days.

(21) Appl. No.: 17/272,584

(22) PCT Filed: Aug. 30, 2019

(86) PCT No.: PCT/US2019/049226
§ 371 (c)(1),
(2) Date: Mar. 1, 2021

(87) PCT Pub. No.: WO2020/047512
PCT Pub. Date: Mar. 5, 2020

(65) Prior Publication Data
US 2021/0251053 A1    Aug. 12, 2021

Related U.S. Application Data

(60) Provisional application No. 62/725,458, filed on Aug. 31, 2018.

(51) Int. Cl.
*H05B 6/06* (2006.01)
*H05B 6/12* (2006.01)
(Continued)

(52) U.S. Cl.
CPC ............... *H05B 6/065* (2013.01); *H05B 6/04* (2013.01); *H05B 6/08* (2013.01); *H05B 6/1272* (2013.01);
(Continued)

(58) Field of Classification Search
CPC . H05B 6/065; H05B 6/04; H05B 6/08; H05B 6/1272; H05B 6/365
(Continued)

(56) References Cited

U.S. PATENT DOCUMENTS

2005/0009070 A1* 1/2005 Arciniegas ................ B01L 9/06
                                                               435/6.11
2011/0192835 A1   8/2011 Lee et al.
(Continued)

FOREIGN PATENT DOCUMENTS

EP          3397022 A1    10/2018
WO   WO 2016/067861 A1    5/2016

OTHER PUBLICATIONS

International Patent Application No. PCT/US2019/049226, International Search Report and Written Opinion dated Dec. 12, 2019, 13 pgs.

*Primary Examiner* — Quang T Van
(74) *Attorney, Agent, or Firm* — Lathrop GPM LLP

(57) ABSTRACT

An induction hob uses induction heating to provide safe, energy efficient and flexible heating of vessels by using multiple coils and a controllable magnetic fluid. In addition, the hob provides increased control over electromagnetic (EM) field spatial distribution in the vicinity of the hob by guiding the EM field through the controllable magnetic fluid, and allows for more precise tuning of each load (which varies with vessel geometry, material properties, and placement) by controlling the volume and spatial distribution of magnetic fluid at each load coil, effectively acting as a tunable inductance in each load.

21 Claims, 7 Drawing Sheets

(51) Int. Cl.
    *H05B 6/04*        (2006.01)
    *H05B 6/08*        (2006.01)
    *H05B 6/36*        (2006.01)

(52) U.S. Cl.
    CPC ......... *H05B 6/365* (2013.01); *H05B 2213/03* (2013.01); *H05B 2213/05* (2013.01)

(58) Field of Classification Search
    USPC ....... 219/620, 621, 622, 623, 624, 625, 626, 219/642, 663, 489; 435/6.11, 91.2, 287.2, 435/289.1
    See application file for complete search history.

(56) References Cited

U.S. PATENT DOCUMENTS

| | | |
|---|---|---|
| 2016/0100460 A1 | 4/2016 | Park et al. |
| 2018/0014363 A1 | 1/2018 | Frank et al. |
| 2020/0244174 A1* | 7/2020 | Kanakasabai ........ H04B 5/0037 |

* cited by examiner

MULTI-COIL INDUCTION HOB AND METHOD

RELATED APPLICATIONS

The present application is a 35 U.S.C. § 371 filing of International Application No. PCT/US2019/049226 filed Aug. 30, 2019, which claims priority to U.S. Provisional Patent Application 62/725,458 filed 31 Aug. 2018, the content of which are incorporated herein by reference in its entirety.

BACKGROUND

Induction heating (IH) is a contactless, fast, and efficient technology for heating of conductive and/or permeable materials. It is becoming one of the preferred heating technologies due to its advantages when compared with other classical heating techniques such as flame heating, resistance heating, traditional ovens, or furnaces and has become common in consumer, commercial and industrial applications. One area where induction heating is seeing increasing use is induction cooktop appliances, more generally known as induction hobs. Industrial uses include any application that requires heating a substance, for example, metals, plastics or carbon fiber composites. Among the most commonly recognized advantages of IH are: speed, efficiency, control, cleanness, and safety. An induction hob as used herein is broadly understood as a device for heating vessels using induction in any setting.

During IH an alternating current source driving a coil generates alternating electromagnetic fields. These electromagnetic fields penetrate inside a conducting and/or permeable target (object to be heated), and induce eddy currents and magnetic dipoles within it. Therefore, the target is heated by means of two physical phenomena: eddy currents and magnetic hysteresis. Inside the target, eddy currents which oppose the alternating magnetic field applied to the induction target produce heating by the Joule effect. This is usually the main heat source in IH processes. In addition to this, magnetic hysteresis creates additional heating in ferromagnetic materials. The typical operating frequencies of these systems range from 10's of kHz up to a few MHz.

An induction hob includes a number of coils beneath an electrically and thermal insulating, non-magnetic surface, typically of glass or ceramic. When the coils are activated, they generate electromagnetic fields to induce heat in cookware on the surface of the hob. The cookware used with an induction hob must be conducting and/or permeable to be effectively heated by the alternating electromagnetic field. An induction hob, like other types of stoves, often includes 4 to 6 coils and requires a pan to be centered on one of the coils during use. Markings are provided on the glass surface to indicate where cookware should be placed.

Another type of induction hob focuses on a concept known as "area cooking", which refers to the added functionality of allowing a user to cook food by placing cookware anywhere on the hob surface (as opposed to requiring the use of designating cooking zones, typically circular areas of fixed radius). Currently, area cooking is achieved by using an array of induction heating coils connected to a multiple-output, or multilevel, inverter for controlling current flow to each coil. There is a non-magnetic gap between the coils and the cookware i.e., the glass or ceramic hob surface. In addition, hobs may provide ferrite shielding between the IH coils and underlying electronics.

However, this solution may be expensive and the component costs scale poorly with a higher number of coils. It is desirable to use many small coils because this allows the electromagnetic (EM) field distribution to be controlled more precisely, so it targets only the cookware being heated, heats the cookware more evenly, and doesn't escape into the area surrounding the induction hob. However, the more coils used in an induction hob, the higher the component count, and thus cost, of the multiple output inverter needed to drive the coils.

Thus, there is a need for an induction hob with an improved design that uses fewer components, allows better control of electromagnetic fields generated by the hob and provides more efficient heating of cookware anywhere on its surface.

SUMMARY

A cooking surface, or hob, uses induction heating to provide safe, energy efficient and flexible heating of cookware by using multiple coils and a controllable magnetic fluid. In addition, the hob provides increased control over electromagnetic (EM) field spatial distribution in the vicinity of the hob by guiding the EM field through the controllable magnetic fluid, and allows for more precise tuning of each load (which varies with cookware geometry, material properties, and placement) by controlling the volume and spatial distribution of magnetic fluid at each load coil, effectively acting as a tunable inductance in each load.

To be completed after claims finalized . . .

DETAILED DESCRIPTION

Embodiments of an induction hob are described below. Although specific numbers, geometries, and arrangements of coils are discussed, this is for purposes of illustration only and embodiments are not limited to only those disclosed. An induction hob will be discussed in embodiments of an induction hob having a planar surface for supporting cookware but principles discussed herein are applicable to other configurations and vessels that are to be heated.

Figure 1A:
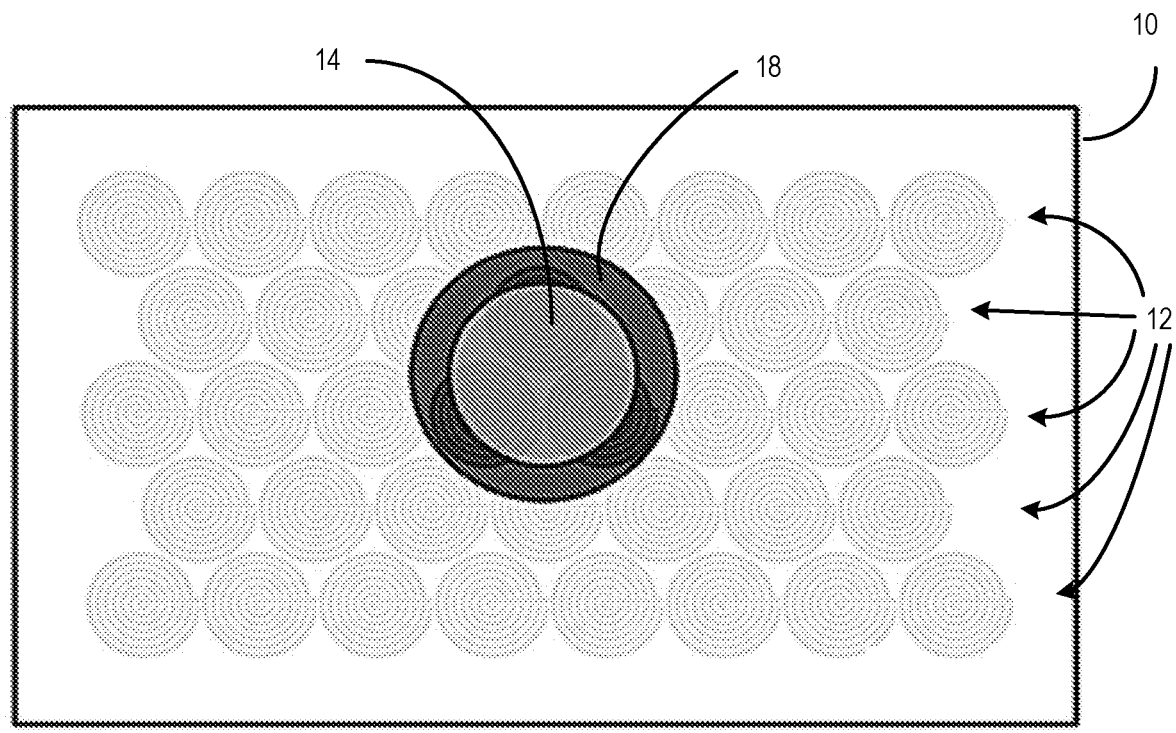
FIG. 1A shows a top view of a multi-coil induction hob.
FIB. 1B shows a side view of the hob of FIG. 1A.

FIG. 1A shows a top view of induction hob 10 with a plurality of induction coils 12. In an embodiment, coils 12 are arranged in five staggered rows of 7 or 8 coils each but any number of rows and coils could be used depending on a preferred size of the hob or other performance considerations. An item of cookware 14 is shown on top of hob 10. In an embodiment, cookware 14 is shown centered on three coils 12 but may be placed anywhere on the surface and cover any number of coils, either fully or partially. In an embodiment, the diameter of at least some of the coils 12 is smaller than the diameter of commonly used cookware although any suitable size of coil may be used. In a further embodiment, the diameter of coils in the array is not identical and varies across the array.

Figure 1B:
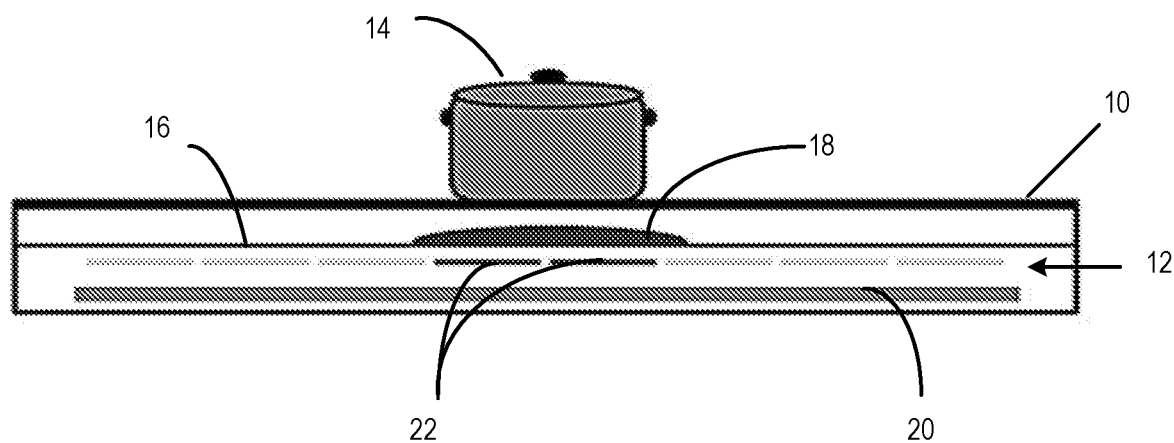

FIG. 1B shows a side view of hob 10 of FIG. 1A. In addition to coils 12 and cookware 14, FIG. 1A also shows a dividing surface 16 for holding magnetic fluid 18 as well as an electronics layer 20. In an embodiment, dividing surface 16 may be above and/or below the array of coils 12, or the coils 12 may be embedded in the dividing surface 16. As will be described in more detail below, individual coils 22 have been activated to heat cookware 14, drawing magnetic fluid 18 across surface 16 to steer the magnetic field toward cookware 14 and improve power coupling. In a further embodiment, although electronics for controlling the operation of hob 10 are shown in a layer 20, they may be located anywhere except where the electromagnetic field is large enough to cause damage to the electronics.

In an embodiment, magnetic fluid 18 will adapt to the size and shape of cookware 14 due to the tendency of magnetic flux to concentrate within magnetic objects. Since fluid 18 and cookware 14 are both magnetic, fluid 18 tends to mimic the size and shape of the cookware due to forces exerted on it by the magnetic field gradient. Therefore, in certain embodiments, the magnetic fluid is a substance that is a) capable of shifting a coil's impedance, b) not detrimental to cooking efficacy, efficiency or safety, and c) able to physically move to a coil which is to be activated, e.g. by using a direct current to impart forces on the magnetic fluid 18. For example, a magnetic fluid may be a ferrofluid, dry magnetic particulates, or many small rolling magnets, although any substance meeting the conditions described above may be used. Embodiments may also use a solid magnet. Further methods of physically moving the magnet or magnetic fluid may be mechanical, electromagnetic, or thermal.

In an embodiment, multi-coil induction hob 10 uses a controllable magnetic fluid 18 to tune each individual load with respect to the operating frequency, replacing or augmenting the function of a multiple-output inverter to control which loads are receiving power from the source, instead allowing for use of a single-output inverter, or a multiple-output inverter of less complexity. Magnetic fluid 18 enables a single-output-inverter-type switching topology to be used to drive a selection of multiple loads, or induction coils 12, in parallel. In an embodiment, hob 10 provides increased control over the EM field spatial distribution of coils 12 by guiding the field through and around the controllable magnetic fluid, and allows for more precise tuning of each load (which varies with cookware geometry, material properties, and placement) by controlling the volume of magnetic fluid at each load coil, effectively acting as a tunable inductance in each load.

Figure 2A:
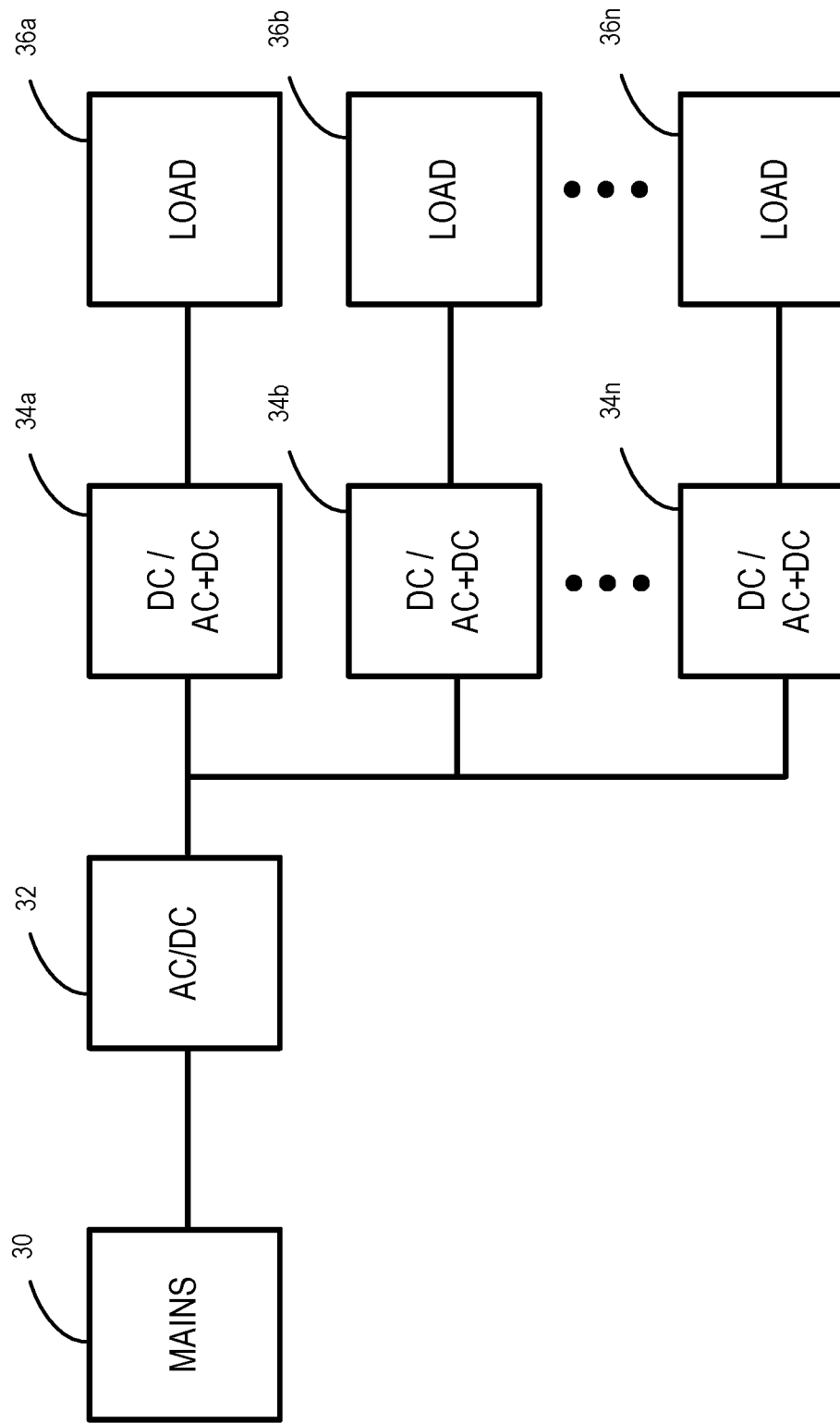
FIGS. 2A-2B show schematic diagrams of circuitry for use in the hob of FIG. 1B.
Figure 2B:
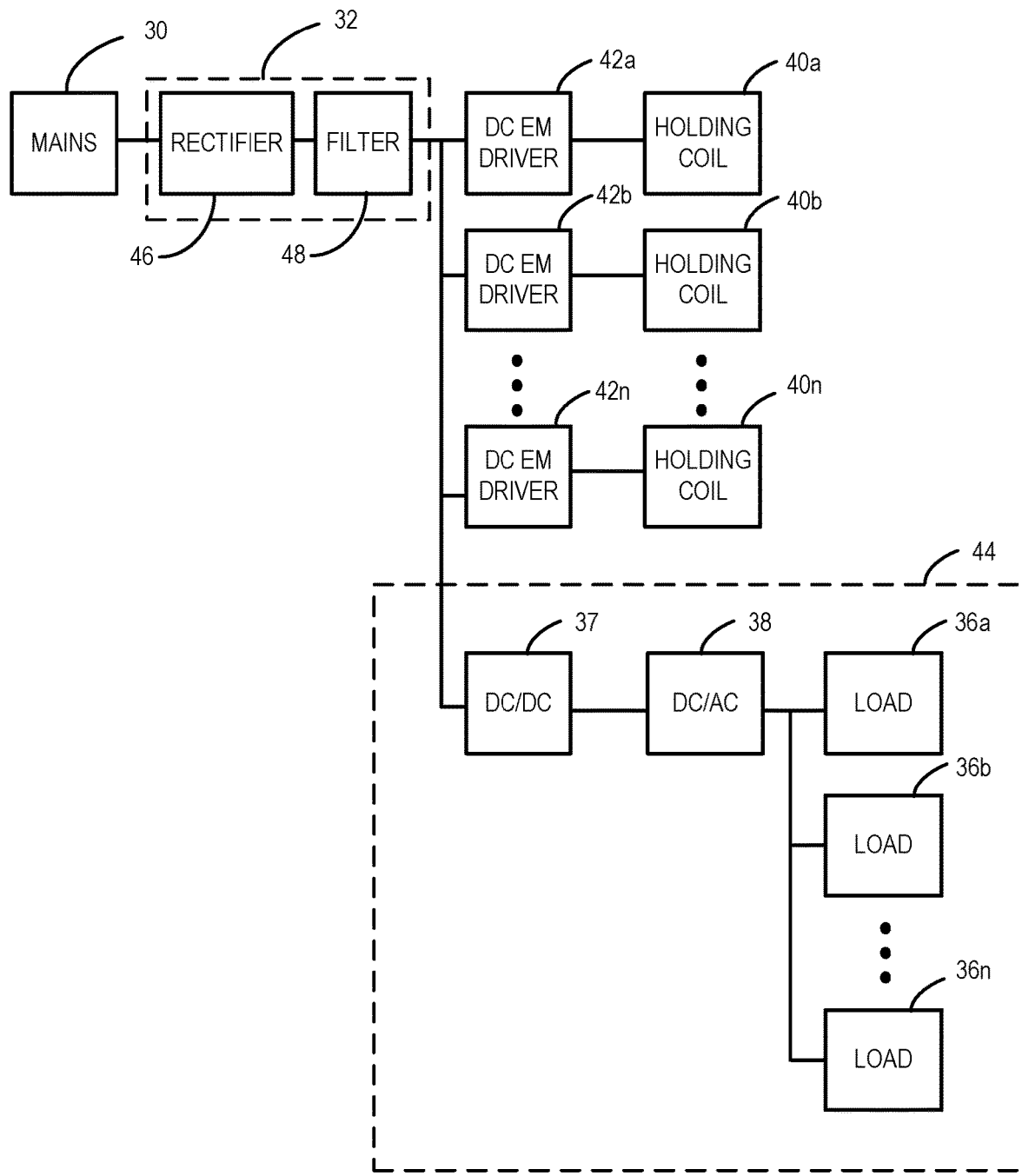

FIGS. 2A-2B show schematic diagrams of embodiments of hob 10. Common reference numbers in both figures are associated with the same element. FIG. 2A illustrates an embodiment having a plurality of loads 36a, 36b . . . 36n, wherein each load includes, for example, a work coil and optionally, a quantity of magnetic fluid and/or cookware. Loads 36a, 36b . . . 36n are controlled by DC/AC+DC converters 34a, 34b . . . 34n, respectively. Converters 34a, 34b . . . 34n provide controllable AC current with a controllable DC offset. Main power source 30 drives an AC/DC converter 32 to provide power to converters 34a, 34b . . . 34n.

A further embodiment is shown in FIG. 2B. AC/DC converter 32 includes, for example, rectifier 46 and filter 48. Similarly to FIG. 2A, individual loads 36a, 36b . . . 36n include, for example, a work coil, coupled cookware target, potential discreet passive elements, and a variable amount of magnetic fluid. Loads 36a, 36b . . . 36n are driven in parallel by DC/AC inverter 38, which is driven by DC/DC converter 37 as shown. In this embodiment, each load 36a, 36b . . . 36n is respectively associated with a holding coil 40a, 40b . . . 40n, for example, an inductor and a variable amount of magnetic fluid. Holding coils 40a, 40b . . . 40n are controlled by DC electromagnet drivers 42a, 42b . . . 42n respectively, to draw magnetic fluid from a reservoir to the vicinity of a work coil, as will be described in more detail below.

In an embodiment, the elements of FIG. 2B shown within dashed line 44 may be replicated several times as necessary in parallel to increase maximum power available to loads. In a further embodiment, all of the elements inside dashed line 44 with the exception of DC/DC converter 37 may also be replicated in parallel. Either of these embodiments result in zones of control wherein the power to groups of loads, or work coils, may be controlled independently via traditional electronic control.

DC/AC inverter 38 may be implemented in a resonant inverter topology, for example, a half-bridge, full bridge, or quasi-resonant topology. The work coil arrangement maybe be implemented as, but is not limited to, the series resonant load configuration. In both of FIGS. 2A-2B, control circuitry and sensors are not shown.

Although various embodiments of driving electronics may be used, a main advantage of all embodiments includes the use of a magnetic fluid in the vicinity of the working coils of an induction heating coil array for the purpose of varying the inductance of individual work coils and shifting their resonance frequency, which allows for a novel method of control over power distribution throughout the array. A further advantage is provided by the magnetic fluids' ability to shape the magnetic field of the work coils into a more advantageous distribution for a particular application.

In an embodiment, a method of operating a multi-coil hob using magnetic fluid includes the following steps. Although several steps are described, this is for purposes of illustration and embodiments are not limited to these specific steps.

1. User places cookware on surface 10.
2. User selects desired cooking temperature via a digital control panel (not shown).
3. Load impedance is tested on each output coil 12.
4. Impedance data/signal is sent to a control system (not shown) which determines which coils will be active ("active coils"), and the magnitude of the AC current necessary for each active coil based on placement of cookware and desired cooking temperature.
5. DC current is sent to the active coils or to DC holding coils associated with active coils as determined in step 4, gradually increasing in magnitude.
6. DC current flowing through active coils or to DC holding coils associated with active coils sets up a gradually increasing, but otherwise static, electromagnetic field.
7. The magnetic field gradient imparts a force on the magnetic fluid held in a reservoir near the coils. Optionally, the magnetic fluid is pumped onto a flow plane, traveling from the high side, to the low side due to gravity as explained below in connection with FIG. 4.
8. The magnetic fluid travels from the reservoir to a position between the cookware and the active coils due to the tendency of the magnetic flux to concentrate within magnetic objects, and the force on the magnetic fluid exerted by the gradient of that field. Optionally, the magnetic fluid travels from the flow plane to a position between the cookware and the active coils.

9. The load impedances are continually tested by sending an AC test signal, at the operating frequency (or at the desired natural frequency of the load, or by sweeping through a range of frequencies), to each load coil individually or by applying a frequency sweep AC signal onto all of the loads simultaneously and sensing the current through each load.

10. When the desired load impedance is achieved on a coil (impedance at which zero voltage switching occurs at the given operating frequency, in the case of a series resonant inverter), DC current to that coil is held constant.

11. When DC current increase is stopped, the magnetic field gradient of the active coils (or the DC holding coils associated with active coils) stabilizes and the magnetic fluid stops moving.

12. Once the desired load impedance is achieved on all active coils, AC current is sent to the entire coil array (a control signal is sent to the inverter causing it to begin switching at the operating frequency).

13. Coils carrying zero DC current ("inactive coils"), and thus without collected magnetic fluid, exhibit lower load inductance than active coils.

14. Inactive coils are out of match with the source (exhibit a natural frequency far from the switching frequency of the inverter), and thus receive minimal AC current from the source.

15. Active coils are tuned to a natural frequency close to the inverter switching frequency (allowing for zero voltage switching, in the case of a series resonant inverter) and thus significant AC current is transmitted from the source to the active coils.

16. The AC current carried on the active coils excites an electromagnetic (EM) field oscillating at the operating (switching) frequency.

17. The electromagnetic field is focused by the magnetic fluid and the magnetic cookware, toward and within the cookware base.

18. The EM field induces an eddy current in the base of the cookware in accordance with Faradays law of induction. This current causes Joule heating in the base of the pan.

19. The EM field also causes hysteresis heating in the base of the pan.

20. Heat transfers from the pan to the food via a combination of thermal conduction, convection, and radiation.

21. The position and matching of the cookware load is continually tested.

22. If the user removes the cookware: DC current is reduced to the active coils (or their associated DC holding coils), rendering them inactive (or the AC current is set to zero at the source).

23. If the user repositions the cookware: The process starts back at Step 1. In an embodiment, the process may skip Step 2 and use the last user inputted cooking temperature setting instead.

24. If the user changes the heat setting of the pan via the control panel, any standard method of controlling the output power of an inverter may be used. For example, a control signal may be sent to either (a) change the AC source current to the array of coils, (b) change the DC source current to the active coils (or their associated DC holding coils), or (c) change the operating frequency, or some combination of (a), (b), and (c). Changing DC source current will reduce the amount of magnetic fluid between the active coils and cookware, changing the match between the source and load, and therefore changing the amount of power transmitted to the cookware. Changing the operating frequency also changes the amount of power transmitted to the cookware by the same matching mechanism, i.e. further separating the operating frequency and the natural frequency of the load.

25. If the user indicates the heating should be stopped via the control panel: A control signal is sent to the source which sets AC current to zero, or DC current to the active coils (or their associated DC holding coils) is set to zero, reducing power coupling to the minimum amount.

26. If an additional piece of cookware is placed on the hob by the user, and the user selects a non-zero cooking temperature for the newly placed cookware via the control panel: Either (a) the AC source current may be temporarily set to zero and the process begins again at Step 3, or (b) the process begins again at Step 3, skipping Step 12. Option (b) is only available in an implementation with multiple inverters as mentioned earlier regarding embodiment where inverter-loads configuration 44 may be replicated several times.

In any of steps 22, 24 or 25, changing the amount of fluid at a load coil may require reducing AC current at the source, under conditions in which the AC current in the load causes a EM field which imparts enough force to hold the fluid in place without additional DC current or if the amount of fluid present on the flow plane is sufficient to bring the AC electromagnetic field on the cooktop above safe levels for an "inactive" coil with no cookware present.

In an embodiment, coils are toggled between active and inactive state by the presence of magnetic fluid, resulting in decreased complexity of the resonant inverter as compared to standard use of multiple output resonant inverters. In an embodiment, increasing the number of coils in a multi-coil array while also reducing the diameter of each coil may provide benefits such as lower cost (as compared to the multiple output resonant inverter alternative), increased field specificity, increased homogeneity of power distribution in cookware base, and greater safety and field coupling efficiency. Further, the minimum sized cookware that can be safely heated is reduced. In addition, dynamically moving magnetic fluid during cooking provides increased homogeneity of power distribution in cookware base and thus, increased evenness of cooking.

In the embodiments above, active coils receive DC power individually to cause magnetic fluid to be attracted to the active coils in the array.

Figure 3:
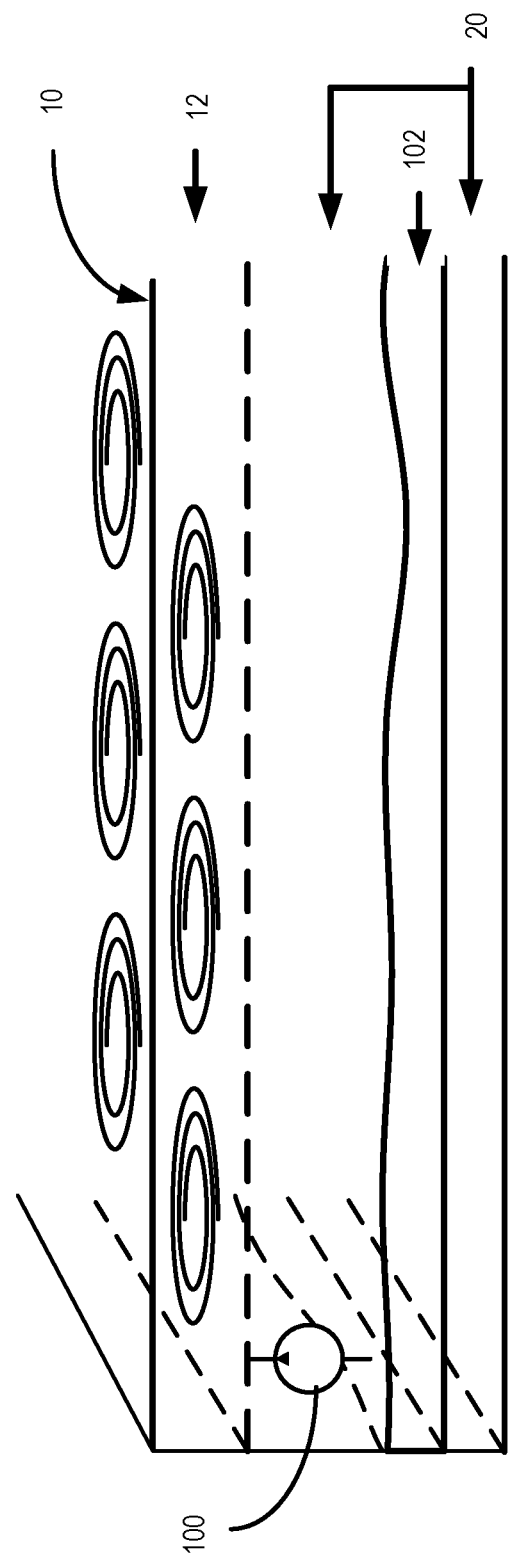
FIG. 3 shows a multi-coil induction hob with a magnetic fluid pump for improved movement of magnetic fluid.

In a further embodiment as shown in FIG. 3, a magnetic fluid reservoir 102 is shown underneath coils 12. Electronics 20 may be located above, below, or beside reservoir 102. A pump 100 may be activated to transport magnetic fluid from the reservoir to a distance at which the nearest induction coil can pull magnetic fluid for further coil-to-coil transfer via modulation of DC current on each coil in the array, until the necessary volume of fluid reaches one or more coils which may be activated for heating cookware. In an embodiment, pump 100 may be an assist coil that draws fluid from reservoir 102, but any suitable pump device may be used. For example, pump 100 may be a single coil with decreasing turn spacing in a vertical direction, or a series of coils with an increasing number of turns in successive coils in a vertical direction. Further pump 100 may be a magnetized helix. Further pump 100 may be a mechanical pump.

Figure 4:
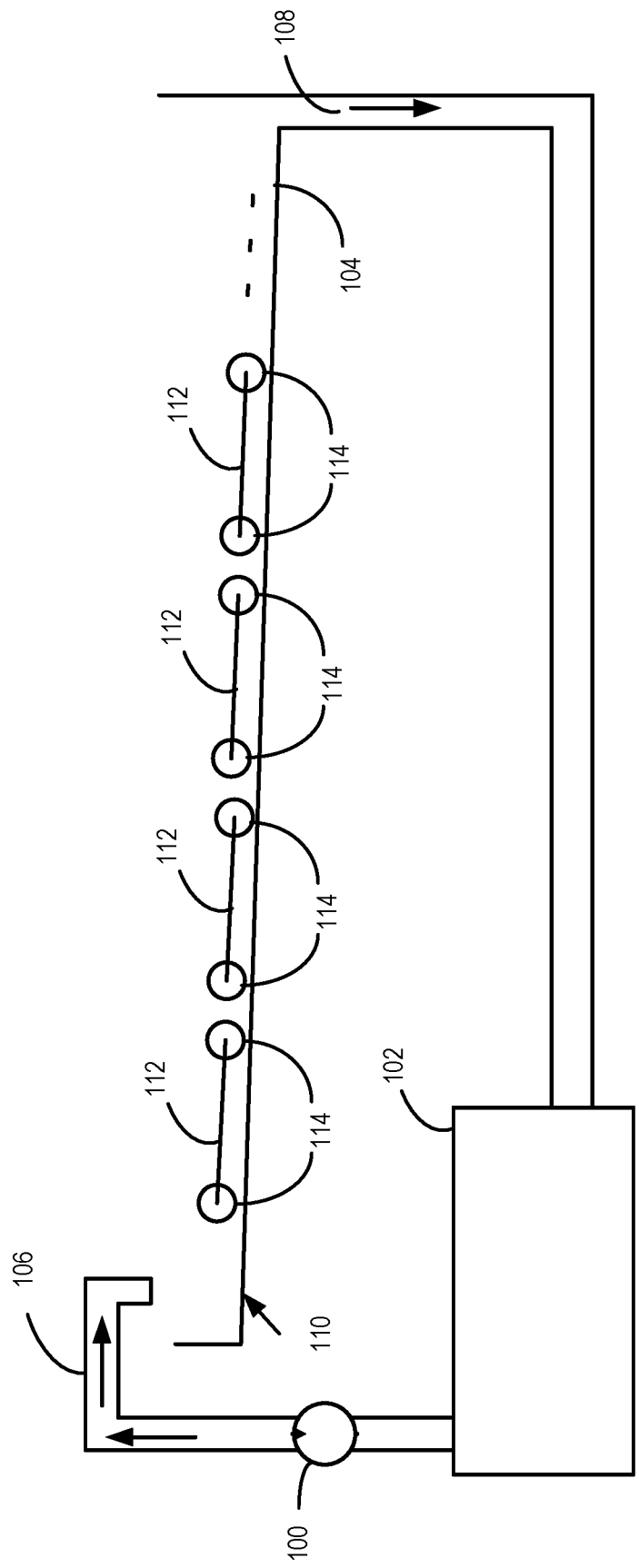
FIG. 4 shows a side view of an embodiment of a multi-coil induction hob.

In an embodiment, a switching device and holding coil, may be associated with each work coil to provide a method of selectively moving the magnetic fluid to any combination of induction coils as shown in FIGS. 4 and 5.

As shown in FIG. 4, a cross-sectional view of a multi-coil induction hob includes work coil array plane. A plurality of work coils 112 arranged in a planar array similar to that shown in FIG. 1A, although any arrangement of work coils may be used. An electrically non-conductive flow surface 104 is positioned slightly below work coil array plane. In an alternative embodiment, flow surface 104 may be located above the work coil array plane, depending on where the particular application demands the magnetic fluid be located during heating. The plane of flow surface 104 and work coil array plane are parallel, or nearly parallel, and the flow surface is slightly sloped such that fluid can flow from the high side to the low side, due to gravity.

Magnetic fluid is pumped from reservoir 102 through conduit 106 onto a high side 110 of flow surface 104. In an embodiment, a traditional mechanical pump or an electromagnetic pump 100 may move magnetic fluid from reservoir 102 onto flow surface 104, but any pumping device may be used as explained above in connection with FIG. 3. A second coil 114, termed a "holding coil", is associated with each work coil 112. Holding coils 114 are electrically independent of the work coils and are rotated 90 degrees out of the plane of the work coil array as will be shown in more detail in FIG. 5. The 90-degree rotation serves to minimize mutual coupling between the holding coils and the work coils. Although a specific physical arrangement of work and holding coils is shown, the only requirement is that the holding coils be rotated out of the plane of the work coil array to minimize mutual coupling.

As magnetic fluid is flowing across flow surface 104, a control signal is sent to operate the switches between the holding coils 114 associated with the individual work coils 112 which are to be activated, and a DC source (not shown), allowing DC current to flow through those holding coils. Magnetic fluid is drawn toward the activated holding coils, due to the high magnetic field gradient near the activated holding coils. Once a sufficient volume of magnetic fluid has been captured by the activated holding coils, a control signal is sent to the pump to stop pumping magnetic fluid onto flow surface 104. The system waits for excess (uncaptured) magnetic fluid to flow off the low side of the flow surface 104.

Magnetic fluid that flows to the edge of the flow surface is collected by a drain 108 that returns excess fluid to magnetic fluid reservoir 102. Although an embodiment of a reservoir and piping is shown in FIG. 4, this is for purposes of illustration only. Any structure which allows magnetic fluid to be added to and collected from flow surface 104 may be used. Once the excess fluid has cleared flow surface 104, holding coils 114 may be deactivated (switches opened, stopping DC current flow). In an alternative, DC current may be continually provided to maintain magnetic fluid in a preferred geometry.

Additionally, the work coil array is energized (AC current begins flowing through the work coils). In an embodiment, magnetic fluid which was captured by holding coils 114, flows toward their respective work coils 112, due to the high magnetic field gradient near work coils 112. As fluid flows onto the selected working coils, the effective inductance of the selected work coils increases, bringing the resonant frequency of those work coils closer to the switching frequency. In an alternative embodiment, for example, when DC current remains on to hold magnetic fluid in position on the holding coils, the fluid may not transfer, or may only partially transfer, onto work coils, but may still be influenced by the force imparted by the AC field, toward the work coils, which may cause the fluid to physically contact the flow surface 104. Further, if flow surface 104 is above work coil array plane, magnetic fluid will not transfer to the work coils. AC current preferentially flows through the selected work coils due to the lower impedance (at the operating frequency) of work coils containing magnetic fluid, which are electrically in parallel with the work coils that do not contain magnetic fluid.

Figure 5A:
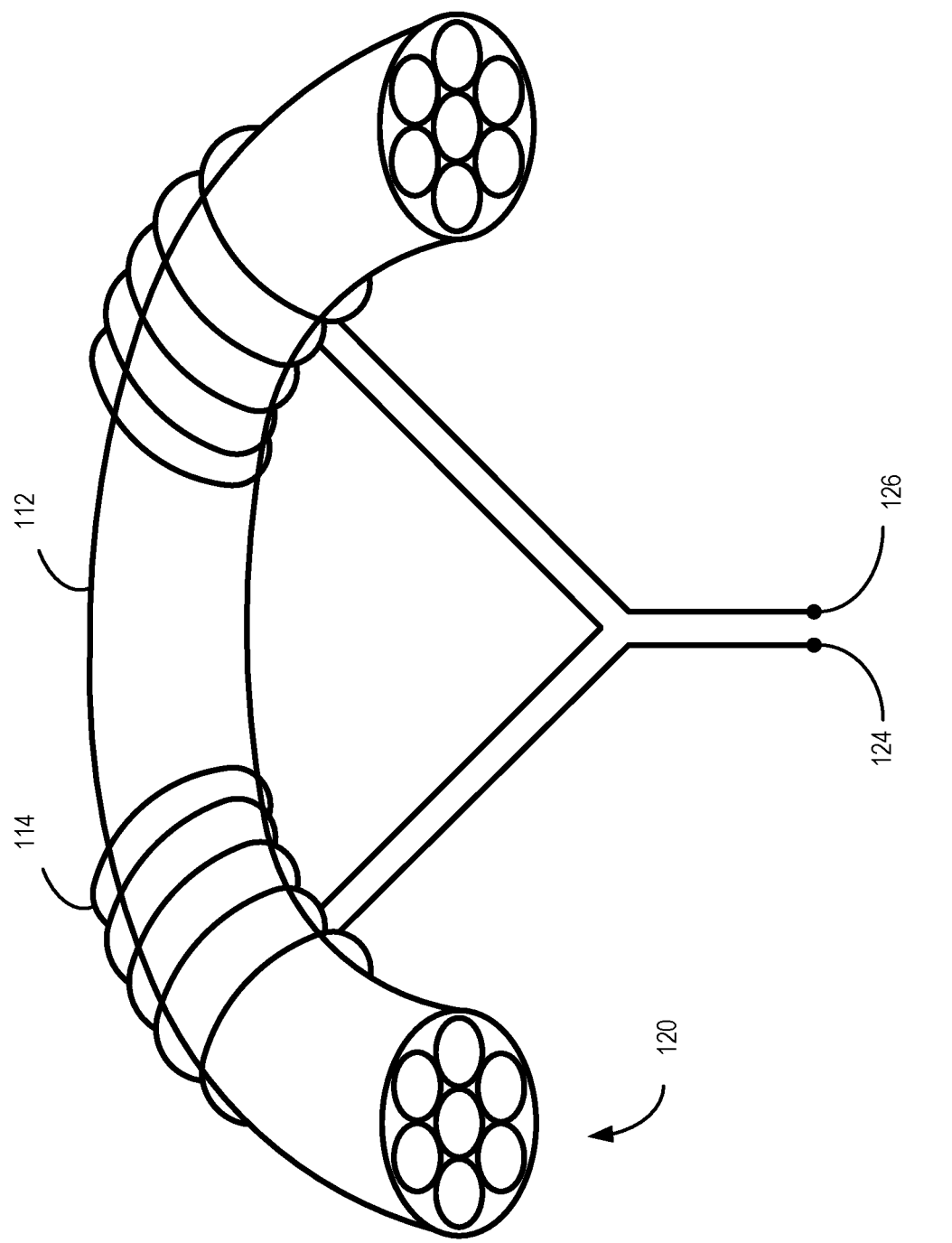
FIG. 5A shows cross-sectional view of work and holding coils of FIG. 4.
Figure 5C:
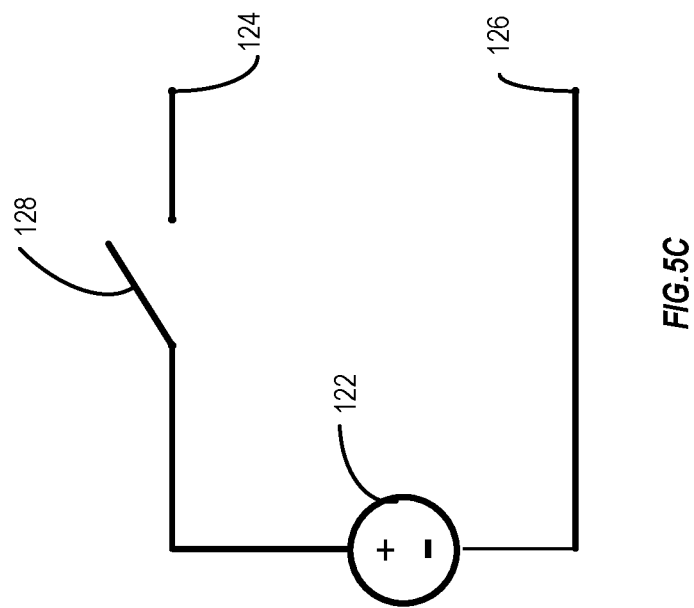
FIG. 5C shows circuitry for use in the embodiment of FIG. 5A.
Figure 5B:
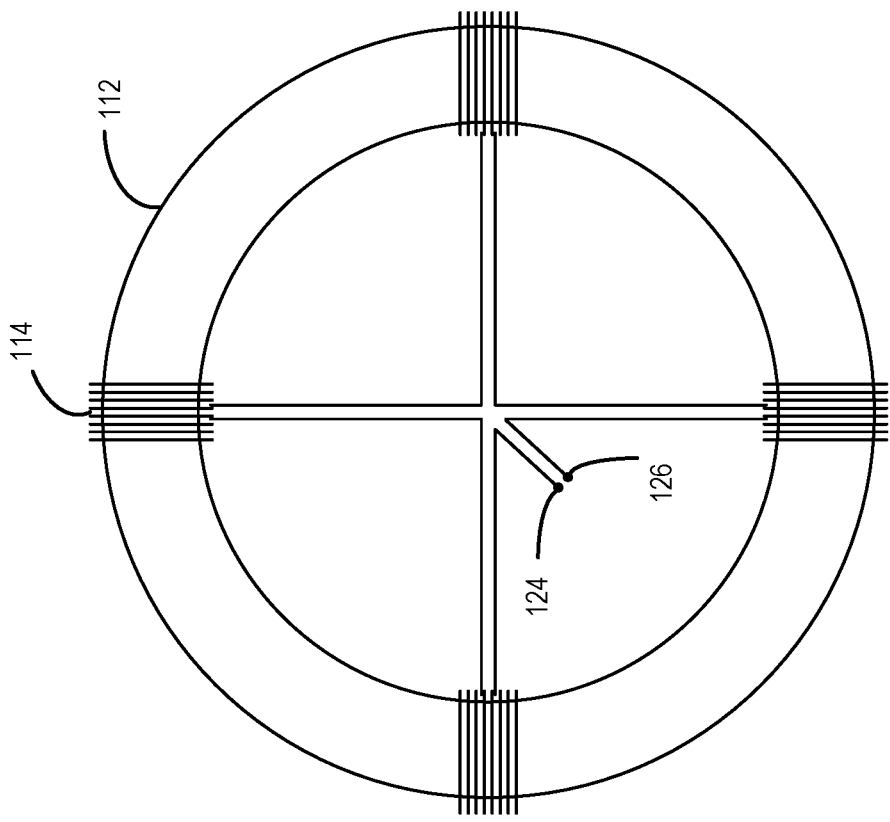
FIG. 5B shows a top view of work and holding coils of FIG. 4.

As shown in FIGS. 5A and 5B, holding coils 114 are wrapped around a bundle of conductors 120 of work coil 112, such that the turns of work coil 112 pass through the open cross-sectional area of the holding coil. Multiple holding coils can be wired in series around each work coil 112 to capture a greater volume of magnetic fluid. The return paths of the wiring for holding coils 114 are spatially configured to minimize coupling between holding coil 114 and work coil 112. As shown in FIG. 5C, DC source 122 is connected to holding coil 114 through connection points 124 and 126. A single switching device 128 between the DC source and each holding coil controls which holding coils carry DC current at any time. Alternatively, each individual holding coil can be connected to its own DC source.

A specific implementation of work and holding coils is shown in FIGS. 4 and 5 for purposes of illustration. A variety of configurations may be used. As explained above, a holding coil must be rotated 90-degrees out of plane from the work coil array to minimize coupling between the work and holding coils. Holding coils need not necessarily be wrapped around the bundle of conductors 120 of the work coil 112. Holding coils may be located above or below the work coil plane. Holding coils may also be co-planar with the work coil plane.

In further embodiments, holding coils may be have a variety of geometries, depending on the needs of an application to optimize AC magnetic field distribution. For example, a holding coil may have multiple triangular turns of a single coil, rotated about center axis of symmetry. Each individual turn is rotated 90 degrees out of the plane of the work coil to minimize mutual coupling between the holding coil and the work coil. This geometry enforces a conical spatial distribution of magnetic fluid. When situated between the work coil and the target, this distribution of magnetic fluid results in a concentration of the AC magnetic field.

In addition to the magnetic field, cookware placed on the hob will also influence the shape of the magnetic field distribution as will geometry of the work coil, the distribution of work coils, and magnetic properties of the fluid. Fluid is drawn in the direction of the magnetic field gradient. If a neighboring coil is also active, depending on the spacing, fluid may be bridged between the two. In an embodiment, fluid flowing onto an inactive coil would have the undesirable result of activating it, or partially activating it. An array of coils may maintain enough distance between adjacent coils so that fluid wouldn't flow unintentionally, but may locate them as densely as possible for better power distribution to cookware.

The proximity of the flow surface reduces the required amount of force necessary that both the holding coils and the working coils need to exhibit on the magnetic fluid in order to hold it in position near the working coils. This lowers the maximum current requirements of the electronics of the DC source(s) driving the holding coils.

Embodiments described above provide several advantages. Magnetic fluid adapts to the size and shape of the cookware due to the tendency of magnetic flux to concentrate within magnetic objects. The fluid and cookware both being magnetic means the fluid will tend to mimic the size and shape of the cookware due to forces exerted on it by the magnetic field gradient, and the fluid may be selectively positioned only on/near those coils located under the cookware. This provides increased field coupling to the cookware and decreases the stray EM field, which improves safety and efficiency of the hob. The magnetic fluid also allows greater specificity in field distribution, reducing coupling to nearby inactive cookware which increases efficiency by decreasing unintended heating in any inactive cookware also placed on the hob.

In addition, the presence of, and control over the amount and position of magnetic fluid allows tuning of the individual loads (individual induction coil and specific cookware or part of a specific cookware influencing the individual load impedance) which provides increased power to the cookware, increased efficiency, and more consistent power coupling to cookware that varies in size, shape, and material. Further, the hob is more tolerant of off-center positioning of cookware over coils by end user because individual load impedances within a group of work coils heating a single target may be tuned to adjust for changes in individual load impedances due to variations in positioning.

Changes may be made in the above system, methods or device without departing from the scope hereof. For example, magnetic fluid may be used to distribute heat within a device incorporating the hob by moving the fluid from higher temperature locations within the device to lower temperature locations and back, via electromagnetic control or mechanical. This may involve running fluid over heat sinks for the electronics to remove waste heat from the electronics and bring it to a location where additional heat is desired.

In a further embodiment, magnetic fluid may be flowed over heat sinks for the electronics to remove waste heat and bring it to heat exchangers which heat water for use in hot water tap resulting in increased overall power efficiency and a faster time to desired hot water temperature. In addition, the use of magnetic fluid in a hob as discussed above, may allow for greater power loss in electronics enabling higher frequency AC current to be employed. This provides advantages of reducing agitation of pets due to high frequency audio emitted by vibrations caused by the AC current interacting with the cookware, and additionally allows for the use of cookware with a thinner base because the higher operating frequency results in smaller skin depth.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A multi-coil induction hob, comprising:
   a plurality of coils;
   magnetic fluid; and
   control circuitry for detecting one or more active coils of the plurality of coils and for causing the magnetic fluid to aggregate near the one or more active coils.
2. The hob of claim 1, wherein the control circuitry further comprises:
   a DC (direct current) source; and
   an AC (alternating current) source.
3. The hob of claim 2, wherein the AC source further comprises an inverter driving the plurality of coils.
4. The hob of claim 3, wherein the AC source further comprises a full-bridge inverter.
5. The hob of claim 3, wherein the AC source further comprises a half-bridge inverter.
6. The hob of claim 3, wherein the AC source further comprises a quasi-resonant inverter.
7. The hob of claim 2, wherein the DC source further comprises switches between the DC source and each coil in the plurality of coils.
8. A multi-coil induction hob, comprising:
   a plurality of work coils arranged in an array forming a plane;
   a plurality of holding coils, each holding coil associated with a work coil and rotated out of the plane formed by the array of work coils;
   magnetic fluid;
   control circuitry for detecting a presence of a vessel above one or more active coils of the plurality of work coils;
   a DC (direct current) source operatively coupled to the plurality of holding coils, said DC source causing the magnetic fluid to aggregate near the one or more active coils by supplying current to one or more holding coils associated with the one or more active coils; and
   an AC (alternating current) source operatively coupled to the plurality of work coils for transmitting AC to the plurality of work coils.
9. The hob of claim 8, wherein the plurality of holding coils is located in the plane of the plurality of work coils.
10. The hob of claim 8, wherein a portion of each work coil passes through an open-cross-sectional area of each holding coil.
11. The hob of claim 8, wherein the plurality of holding coils is located in a plane above the plane of the plurality of work coils.
12. The hob of claim 7, wherein the plurality of holding coils is located in a plane below the plane of the plurality of work coils.
13. The hob of claim 1, further comprising:
    a flow surface below the plurality of holding coils; and
    a pump for pumping magnetic fluid onto the flow surface.
14. A method of operating a multi-coil induction hob comprising a plurality of work coils, a plurality of holding coils and magnetic fluid, the method comprising:
    determining active work coils by testing for each of the plurality of work coils an impedance indicating a presence of cookware above the work coil and a magnitude of alternating current (AC) needed for heating the work coil to a temperature input by a user;
    connecting a direct current (DC) source to one or more holding coils, each associated with an active work coil, for drawing magnetic fluid to the one or more holding coils;
    continuing to test the impedance of the active coils while increasing the direct current until a desired load impedance is achieved; and
    connecting an AC source to the plurality of work coils.
15. The method of claim 14, further comprising:
    continuing to test the impedance of the plurality of work coils.
16. The method of claim 15, wherein, in response to a change in impedance indicating that cookware has been removed from an active coil, reducing the direct current to the holding coil associated with the active coil.
17. The method of claim 15, wherein, in response to a change in impedance indicating cookware has been removed from an active coil, reducing the alternating current to the active coil.
18. The method of claim 14, wherein, in response to an indication that a new temperature has been input by a user, changing the direct current to the holding coil associated with the active coil.

19. The method of claim 14, wherein, in response to an indication that a new temperature has been input by a user, changing the amplitude of alternating current to the active coil.

20. The method of claim 14, wherein, in response to an indication that a new temperature has been input by a user, changing the frequency of alternating current to the active coil.

21. The method of claim 14, further comprising, in response to a piece of cookware being added to the hob:
   setting the AC source to provide zero current;
   determining active work coils by testing, for each of the plurality of work coils, an impedance indicating a presence of cookware above the work coil and a magnitude and frequency of AC needed for heating the cookware to a temperature input by a user;
   connecting a DC source to one or more holding coils, each associated with an active work coil, for drawing magnetic fluid to the holding coil;
   continuing to test the impedance of the active coils while increasing the direct current until a desired impedance match is achieved; and
   connecting an AC source to the plurality of work coils.

* * * * *